US010178410B2

(12) United States Patent
Fu et al.

(10) Patent No.: US 10,178,410 B2
(45) Date of Patent: Jan. 8, 2019

(54) METHOD AND APPARATUS OF MOTION INFORMATION MANAGEMENT IN VIDEO CODING

(71) Applicant: Mediatek Inc., Hsinchu (TW)

(72) Inventors: Chih-Ming Fu, Hsinchu (TW); Yi-Wen Chen, Taichung (TW); Jian-Liang Lin, Su'ao Township, Yilan County (TW); Yu-Wen Huang, Taipei (TW)

(73) Assignee: MEDIATEK INC., Hsinchu (TW)

( * ) Notice: Subject to any disclaimer, the term of this patent is extended or adjusted under 35 U.S.C. 154(b) by 383 days.

(21) Appl. No.: 14/433,303

(22) PCT Filed: Aug. 29, 2013

(86) PCT No.: PCT/CN2013/082569
§ 371 (c)(1),
(2) Date: Apr. 2, 2015

(87) PCT Pub. No.: WO2014/053085
PCT Pub. Date: Apr. 10, 2014

(65) Prior Publication Data

US 2015/0281733 A1 Oct. 1, 2015

Related U.S. Application Data

(60) Provisional application No. 61/714,359, filed on Oct. 16, 2012, provisional application No. 61/744,890, filed on Oct. 3, 2012.

(51) Int. Cl.
*H04N 19/597* (2014.01)
*H04N 19/105* (2014.01)
(Continued)

(52) U.S. Cl.
CPC ......... *H04N 19/597* (2014.11); *H04N 19/105* (2014.11); *H04N 19/139* (2014.11);
(Continued)

(58) Field of Classification Search
None
See application file for complete search history.

(56) References Cited

U.S. PATENT DOCUMENTS

2005/0232358 A1 10/2005 Nicolas
2007/0064800 A1* 3/2007 Ha .................... H04N 13/0048 375/240.12
(Continued)

FOREIGN PATENT DOCUMENTS

CN 102300087 12/2011
EP 1 775 954 4/2007
(Continued)

OTHER PUBLICATIONS

Schwarz et al. ("Inter-view Prediction of Motion Data in Multiview Video Coding" 2012 Picture Coding Symposium May 2012).*
(Continued)

*Primary Examiner* — Kate H Luo
(74) *Attorney, Agent, or Firm* — Oblon, McClelland, Maier & Neustadt, L.L.P.

(57) ABSTRACT

A method and apparatus for three-dimensional and scalable video coding are disclosed. Embodiments according to the present invention determine a motion information set associated with the video data, wherein at least part of the motion information set is made available or unavailable conditionally depending on the video data type. The video data type may correspond to depth data, texture data, a view associated with the video data in three-dimensional video coding, or a layer associated with the video data in scalable video coding. The motion information set is then provided for coding or decoding of the video data, other video data, or both. At least a flag may be used to indicate whether part of the motion information set is available or unavailable. Alternatively, a coding profile for the video data may be
(Continued)

used to determine whether the motion information is available or not based on the video data type.

15 Claims, 6 Drawing Sheets

(51) Int. Cl.

| | |
|---|---|
| ***H04N 19/139*** | (2014.01) |
| ***H04N 19/513*** | (2014.01) |
| ***H04N 19/187*** | (2014.01) |
| ***H04N 19/70*** | (2014.01) |
| ***H04N 19/30*** | (2014.01) |

(52) U.S. Cl.
CPC ........... *H04N 19/187* (2014.11); *H04N 19/30* (2014.11); *H04N 19/513* (2014.11); *H04N 19/70* (2014.11)

(56) References Cited

U.S. PATENT DOCUMENTS

| | | | | |
|---|---|---|---|---|
| 2009/0010323 | A1* | 1/2009 | Su | H04N 19/597 375/240.01 |
| 2009/0168874 | A1* | 7/2009 | Su | H04N 19/597 375/240.12 |
| 2009/0290643 | A1* | 11/2009 | Yang | H04N 19/597 375/240.16 |
| 2010/0165077 | A1* | 7/2010 | Yin | H04N 19/597 348/42 |
| 2011/0069760 | A1* | 3/2011 | Lee | H04N 5/145 375/240.16 |
| 2012/0195368 | A1* | 8/2012 | Chien | H04N 19/52 375/240.02 |
| 2012/0229602 | A1* | 9/2012 | Chen | H04N 19/597 348/43 |
| 2012/0230412 | A1* | 9/2012 | Lee | H04N 19/139 375/240.16 |
| 2012/0269269 | A1* | 10/2012 | Choi | H04N 19/597 375/240.16 |
| 2013/0188013 | A1* | 7/2013 | Chen | H04N 19/597 348/43 |

FOREIGN PATENT DOCUMENTS

| | | |
|---|---|---|
| WO | WO 2006/087609 | 8/2006 |
| WO | 2012039936 A1 | 3/2012 |
| WO | WO 2012/097749 | 7/2012 |

OTHER PUBLICATIONS

Tech et al. ("3D-HEVC Test Model 1" Jul. 2012).*
International Search Report dated Nov. 28, 2013, issued in PCT/CN2013/082569.

* cited by examiner

METHOD AND APPARATUS OF MOTION INFORMATION MANAGEMENT IN VIDEO CODING

CROSS REFERENCE TO RELATED APPLICATIONS

The present invention is a National Stage of PCT/CN2013/082569, filed on Aug. 29, 2013, which claims priority to U.S. Provisional Patent Application, Ser. No. 61/744,890, filed Oct. 3, 2012, entitled "Motion Information Management for Video Coding" and U.S. Provisional Patent Application, Ser. No. 61/714,359, filed Oct. 16, 2012, entitled "Motion Information Management for Video Coding". These priority applications are hereby incorporated by reference in their entireties.

TECHNICAL FIELD

The present invention relates to three-dimensional video coding (3DVC) and scalable video coding (SVC). In particular, the present invention relates to motion information management associated with temporal motion vector prediction (TMVP) in order to reduce the size of required buffer.

BACKGROUND

In advanced video coding, such as High Efficiency Video Coding (HEVC), temporal motion parameter (e.g. motion vectors (MVs), reference index, prediction mode) is used for MV prediction. Therefore, the motion parameters from previous pictures need to be stored in a motion parameter buffer. However, the size of motion parameter buffer may become quite significant since the granularity of motion representation can be as small as 4×4. There are two motion vectors per prediction unit (PU) that need to be stored for B-slices (bi-predicted slice). On the other hand, as the picture size continues to grow, the memory issue becomes even worse since not only more motion vectors need to store, but also more bits per vector need to use for representing the motion vector. For example, the estimated storage for MVs is approximately 26 Mbits/picture for video with picture size 4 k by 2 k and the actual size will depend on the precision and maximum MVs supported.

In order to reduce the size of the motion parameter buffer, a compression technique for motion parameters is being used in systems based on high efficiency video coding (HEVC), which stores the coded motion information from previous pictures at lower spatial resolution. It uses decimation to reduce the number of motion vectors to be stored. The decimated motion vectors are associated with larger granularity instead of 4×4. The compression process for motion parameter buffer replaces the coded motion vector buffer with a reduced buffer to store motion vectors corresponding to lower spatial resolution (i.e., larger granularity). Each compressed vector is calculated as component-wise decimation.

In HEVC, the motion information compression is achieved using a decimation method as shown in FIG. 1, where each small square block consists of 4×4 pixels. In this example, the motion information compression is performed for each region consisting of 16×16 pixels (as indicated by a thick box). A representative block as indicated by a shaded area is selected and all the blocks within each 16×16 region share the same motion vectors, reference picture indices and prediction mode of the representative block. In FIG. 1, the top left 4×4 block is used as the representative block for the whole 16×16 region. In other words, 16 blocks share the same motion information. Accordingly, a 16:1 motion information compression is achieved in this example.

Three-dimensional (3D) video coding is developed for encoding/decoding video of multiple views simultaneously captured by cameras corresponding to different views. Since all cameras capture the same scene from different viewpoints, a multi-view video contains a large amount of inter-view redundancy. In order to share the previously encoded texture information of adjacent views, disparity-compensated prediction (DCP) has been added as an alternative to motion-compensated prediction (MCP). MCP refers to inter-picture prediction that uses previously coded pictures of the same view, while DCP refers to inter-picture prediction that uses previously coded pictures of other views in the same access unit. FIG. 2 illustrates an example of 3D video coding system incorporating MCP and DCP. The vector (210) used for DCP is termed as disparity vector (DV), which is analog to the motion vector (MV) used in MCP. FIG. 2 illustrates an example of three MVs (220, 230 and 240) associated with MCP. Furthermore, the DV of a DCP block can also be predicted by the disparity vector predictor (DVP) candidate derived from neighboring blocks or the temporal collocated blocks that also use inter-view reference pictures. In HTM3.1 (HEVC based test model version 3.1 for 3D video coding), when deriving an inter-view Merge candidate for Merge/Skip modes, if the motion information of a corresponding block is not available or not valid, the inter-view Merge candidate is replaced by a DV.

To share the previously coded residual information of adjacent views, the residual signal of the current block (PU) can be predicted by the residual signals of the corresponding blocks in the inter-view pictures as shown in FIG. 3. The corresponding blocks can be located by respective DVs. The video pictures and depth maps corresponding to a particular camera position are indicated by a view identifier (i.e., V0, V1 and V2 in FIG. 3). All video pictures and depth maps that belong to the same camera position are associated with the same viewId (i.e., view identifier). The view identifiers are used for specifying the coding order within the access units and detecting missing views in error-prone environments. An access unit includes all video pictures and depth maps corresponding to the same time instant. Inside an access unit, the video picture and any associated depth map having viewId equal to 0 are coded first, followed by the video picture and depth map having viewId equal to 1, etc. The view with viewId equal to 0 (i.e., V0 in FIG. 3) is also referred to as the base view or the independent view. The base view video pictures can be coded using a conventional HEVC video coder without dependence on any other view.

As can be seen in FIG. 3, motion vector predictor (MVP)/disparity vector predictor (DVP) for the current block can be derived from the inter-view blocks in the inter-view pictures. In the following, inter-view blocks in inter-view picture may be abbreviated as inter-view blocks. The derived candidates are termed as inter-view candidates, which can be inter-view MVPs or DVPs. Furthermore, a corresponding block in a neighboring view is termed as an inter-view block and the inter-view block is located using the disparity vector derived from the depth information of current block in current picture.

As described above, DV is critical in 3D video coding for disparity vector prediction, inter-view motion prediction, inter-view residual prediction, and disparity-compensated prediction (DCP) or any other coding tool that needs to indicate the correspondence between inter-view pictures.

Compressed digital video has been widely used in various applications such as video streaming over digital networks and video transmission over digital channels. Very often, a single video content may be delivered over networks with different characteristics. For example, a live sport event may be carried in a high-bandwidth streaming format over broadband networks for premium video services. In such applications, the compressed video usually preserves high resolution and high quality so that the video content is suited for high-definition devices such as an HDTV or a high resolution LCD display. The same contents may also be carried through cellular data network so that the contents can be watched on a portable device such as a smart phone or a network-connected portable media device. In such applications, due to the network bandwidth concerns as well as the typically lower resolution display on the smart phone or portable device, the video content usually is compressed into lower resolution and lower bitrates. Therefore, for different network environment and for different applications, the video resolution and video quality requirements are quite different. Even for the same type of network, users may experience different available bandwidths due to different network infrastructure and network traffic condition. Therefore, a user may desire to receive the video at higher quality when the available bandwidth is high and receive a lower-quality, but smooth, video when the network congestion occurs. In another scenario, a high-end media player can handle high-resolution and high bitrate compressed video while a low-cost media player is only capable of handling low-resolution and low bitrate compressed video due to limited computational resources. Accordingly, it is desirable to construct the compressed video in a scalable manner so that videos at different spatial-temporal resolutions and/or quality can be derived based on the same compressed bitstream.

The joint video team (JVT) of ISO/IEC MPEG and ITU-T VCEG standardizes a Scalable Video Coding (SVC) extension of the H.264/AVC standard. An H.264/AVC SVC bitstream may contain video information from low frame-rate, low resolution, and low quality to high frame rate, high definition, and high quality. This single bitstream can be adapted to various applications and displayed on devices with different configurations. Accordingly, H.264/AVC SVC is suitable for various video applications such as video broadcasting, video streaming, and video surveillance to adapt to the network infrastructure, traffic condition, user preference, etc.

In SVC, three types of scalabilities, i.e., temporal scalability, spatial scalability, and quality scalability, are provided. SVC uses multi-layer coding structure to realize the three dimensions of scalability. A main goal of SVC is to generate one scalable bitstream that can be easily and rapidly adapted to the bit-rate requirement associated with various transmission channels, diverse display capabilities, and different computational resources without trans-coding or re-encoding. An important feature of the SVC design is that the scalability is provided at a bitstream level. In other words, bitstreams for deriving video with a reduced spatial and/or temporal resolution can be simply obtained by extracting Network Abstraction Layer (NAL) units (or network packets) from a scalable bitstream. NAL units for quality refinement can be additionally truncated in order to reduce the bit-rate and the associated video quality.

For temporal scalability, a video sequence can be hierarchically coded in the temporal domain. For example, temporal scalability can be achieved using hierarchical coding structure based on B-pictures according to the H.264/AVC standard. FIG. 4 illustrates an example of hierarchical B-picture structure with 4 temporal layers and the Group of Pictures (GOP) includes eight pictures. Pictures 0 and 8 in FIG. 4 are called key pictures. Inter prediction of key pictures only uses previous key pictures as references. Other pictures between two key pictures are predicted hierarchically. The video having only the key pictures forms the coarsest temporal resolution of the scalable system. Temporal scalability is achieved by progressively refining a lower-level (coarser) video by adding more B pictures corresponding to enhancement layers of the scalable system. In the example of FIG. 4, picture 4 (in the display order) is first bi-directionally predicted using key pictures (i.e., pictures 0 and 8) after the two key pictures are coded. After picture 4 is processed, pictures 2 and 6 are processed. Picture 2 is bi-directionally predicted using pictures 0 and 4, and picture 6 is bi-directionally predicted using pictures 4 and 8. After pictures 2 and 6 are coded, remaining pictures, i.e., pictures 1, 3, 5 and 7 are processed bi-directionally using two respective neighboring pictures as shown in FIG. 4. Accordingly, the processing order for the GOP is 0, 8, 4, 2, 6, 1, 3, 5, and 7. The pictures processed according to the hierarchical process of FIG. 4 results in hierarchical four-level pictures, where pictures 0 and 8 belong to the first temporal order, picture 4 belongs the second temporal order, pictures 2 and 6 belong to the third temporal order and pictures 1, 3, 5, and 7 belong to the fourth temporal order. By decoding the base level pictures and adding higher temporal order pictures will be able to provide a higher level video. For example, base-level pictures 0 and 8 can be combined with second temporal-order picture 4 to form second-level pictures. By further adding the third temporal-order pictures to the second-level video can form the third-level video. Similarly, by adding the fourth temporal-order pictures to the third-level video can form the fourth-level video. Accordingly, the temporal scalability is achieved. If the original video has a frame rate of 30 frames per second, the base-level video has a frame rate of 30/8=3.75 frames per second. The second-level, third-level and fourth-level video correspond to 7.5, 15, and 30 frames per second. The first temporal-order pictures are also called base-level video or based-level pictures. The second temporal-order pictures through fourth temporal-order pictures are also called enhancement-level video or enhancement-level pictures. In addition to enabling temporal scalability, the coding structure of hierarchical B-pictures also improves the coding efficiency over the typical IBBP GOP structure at the cost of increased encoding-decoding delay.

In SVC, spatial scalability is supported based on the pyramid coding scheme. First, the video sequence is down-sampled to smaller pictures with coarser spatial resolutions (i.e., layers). In addition to dyadic spatial resolution, SVC also supports arbitrary resolution ratios, which is called extended spatial scalability (ESS). In order to improve the coding efficiency of the enhancement layers (video layers with coarser resolutions), the inter-layer prediction schemes are introduced. Three inter-layer prediction tools are adopted in SVC, namely inter-layer motion prediction, inter-layer intra prediction, and inter-layer residual prediction.

The inter-layer prediction process comprises identifying the collocated block in a lower layer (e.g. BL) based on the location of a corresponding EL block. The collocated lower layer block is then interpolated to generate prediction samples for the EL as shown in FIG. 5. In scalable video coding, the interpolation process is used for inter-layer prediction by using predefined coefficients to generate the prediction samples for the EL based on a lower layer pixels.

The example in FIG. 5 consists of two layers. However, an SVC system may consist of more than two layers. The BL picture is formed by applying spatial decimation 510 to the input picture (i.e., an EL picture in this example). The BL processing comprises BL prediction 520. The BL input is predicted by BL prediction 520, where subtractor 522 is used to form the difference between the BL input data and the BL prediction. The output of subtractor 522 corresponds to the BL prediction residues and the residues are processed by transform/quantization (T/Q) 530 and entropy coding 570 to generate compressed bitstream for the BL. Reconstructed BL data has to be generated at the BL in order to form BL prediction. Accordingly, inverse transform/inverse quantization (IT/IQ) 540 is used to recover the BL residues. The recovered BL residues and the BL prediction data are combined using reconstruction 550 to form reconstructed BL data. The reconstructed BL data is processed by in-loop filter 560 before it is stored in buffers inside the BL prediction. In the BL, BL prediction 520 uses Inter/Intra prediction 521. The EL processing consists of similar processing modules as the BL processing. The EL processing comprises EL prediction 525, subtractor 528, T/Q 535, entropy coding 575, IT/IQ 545, reconstruction 555 and in-loop filter 565. However, the EL prediction also utilizes reconstructed BL data as part of inter-layer prediction. Accordingly, EL prediction 525 comprises inter-layer prediction 527 in addition to Inter/Intra prediction 526. The reconstructed BL data is interpolated using interpolation 512 before it is used for inter-layer prediction. The compressed bitstreams from the BL and the EL are combined using multiplexer 580 to form a scalable bitstream.

In EL coding unit coding, a flag can be coded to indicate whether the EL motion information is directly derived from the BL. If the flag is equal to 1, the partitioning data of the EL coding unit together with the associated reference indexes and motion vectors are derived from the corresponding data of the collocated block in the BL. The reference picture index of BL is directly used in EL. The coding unit partitioning and motion vectors of EL correspond to the scaled coding unit partitioning and scaled motion vectors of the BL respectively. Besides, the scaled BL motion vector can be used as an additional motion vector predictor for the EL.

As illustrated in the above discussion, the DV and MV information is used for inter-view predictive coding in three-dimensional video coding systems and inter-layer predictive coding in scalable video coding systems. The DV and MV information may have to be stored for one or more reference pictures or depth maps. Therefore, the amount of storage may be substantial. It is desirable to reduce the required MV/DV information storage.

SUMMARY

A method and apparatus for three-dimensional and scalable video coding are disclosed. Embodiments according to the present invention determine a motion information set associated with the video data, wherein at least part of the motion information set is made available or unavailable conditionally depending on the video data type, the layer type, or the view type of the video data. The motion information set determined is then provided for coding or decoding of the current video data, wherein the video data comprises texture data and depth data, base layer data and enhancement layer data, or base view data and dependent view data. At least a flag may be used to indicate whether said at least part of the motion information set is available or unavailable. The flag may be signaled in a sequence level, a picture level, a slice level, a video parameter set or an adaptation parameter set. Alternatively, the flag may be set to a value indicating whether said at least part of the motion information set is available or unavailable according to a coding profile for the video data, wherein the flag corresponds to a syntax element in a sequence level, a picture level, a slice level, a video parameter set or an adaptation parameter set.

A three-dimensional video coding or a scalable video coding system can be configured according to a coding profile, or a flag in the bitstream to make motion information available or unavailable depending on the video data type. In one embodiment, the temporal motion information is made unavailable for the depth sequence/picture, and the temporal motion information is made available for the texture sequence/picture in a dependent view or a base view. In another embodiment, the temporal motion information is made unavailable for the texture sequence/picture in a dependent view, and the temporal motion information is made available for the texture sequence/picture or the depth sequence/picture in a base view. In yet another embodiment, the temporal motion information is made unavailable for the texture sequence/picture or the depth sequence/picture in a dependent view, and the temporal motion information is made available for the texture sequence/picture in a base view. In yet another embodiment, the temporal motion information is made unavailable for the texture sequence/picture or the depth sequence/picture in an enhancement layer, and the temporal motion information is made available for the texture sequence/picture or the depth sequence/picture in a base layer.

DETAILED DESCRIPTION

Figure 1:
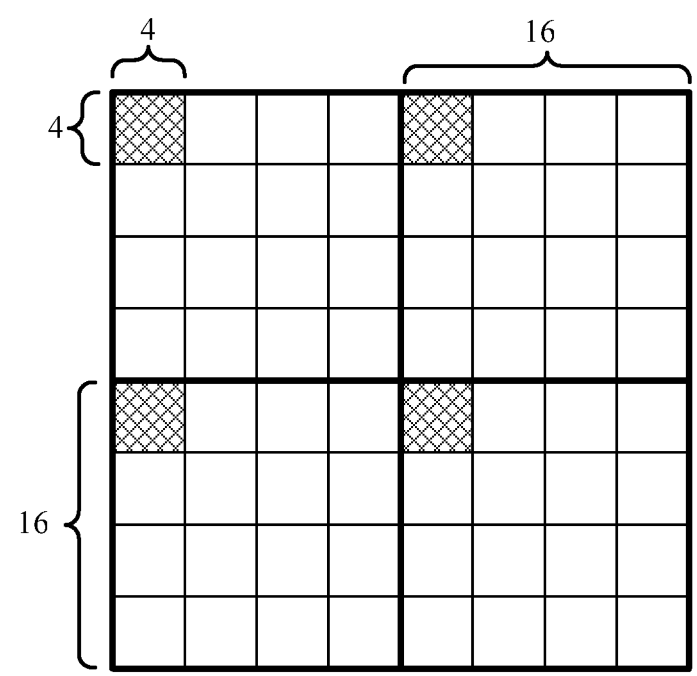
FIG. 1 illustrates an example of motion information compression using motion vector decimation according to a reference implementation of high efficiency video coding (HEVC).
Figure 2:
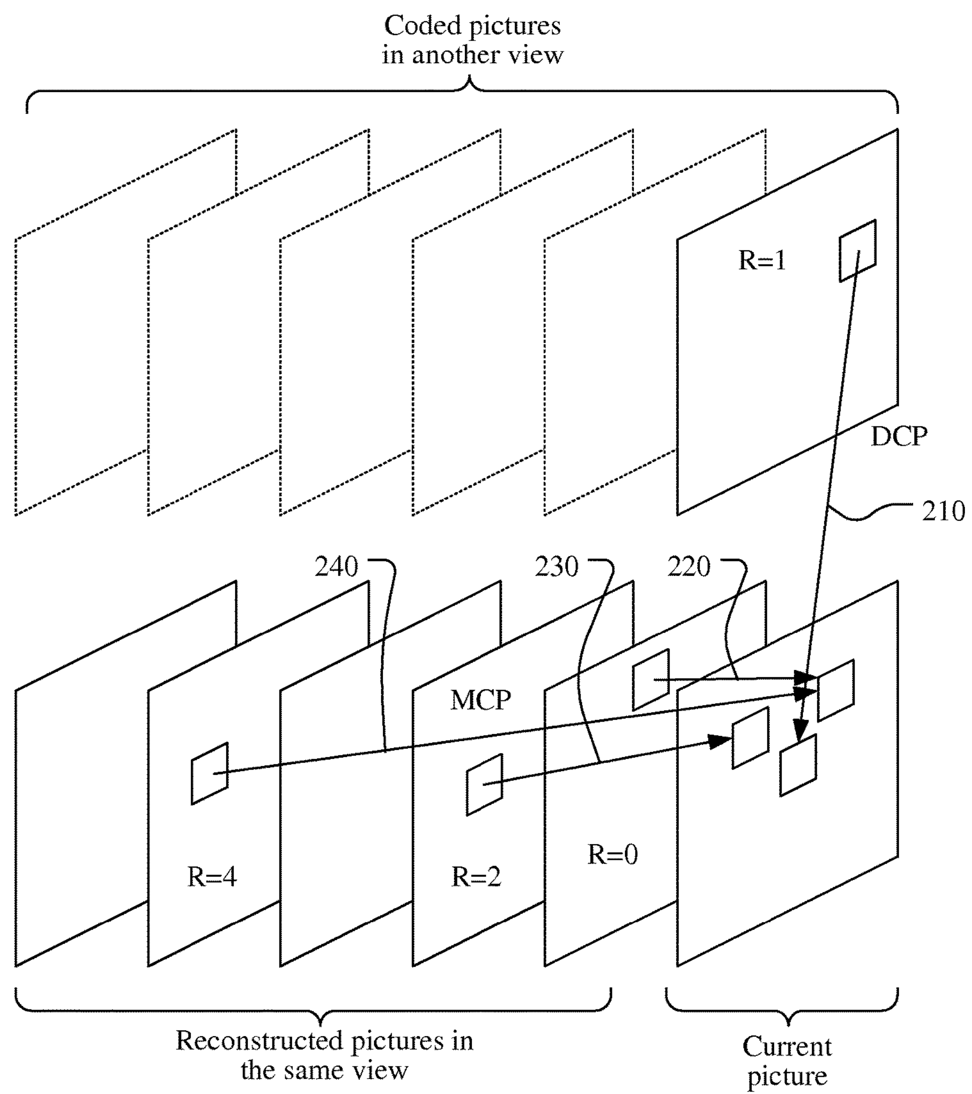
FIG. 2 illustrates an example of three-dimensional video coding incorporating disparity-compensated prediction (DCP) as an alternative to motion-compensated prediction (MCP).
Figure 3:
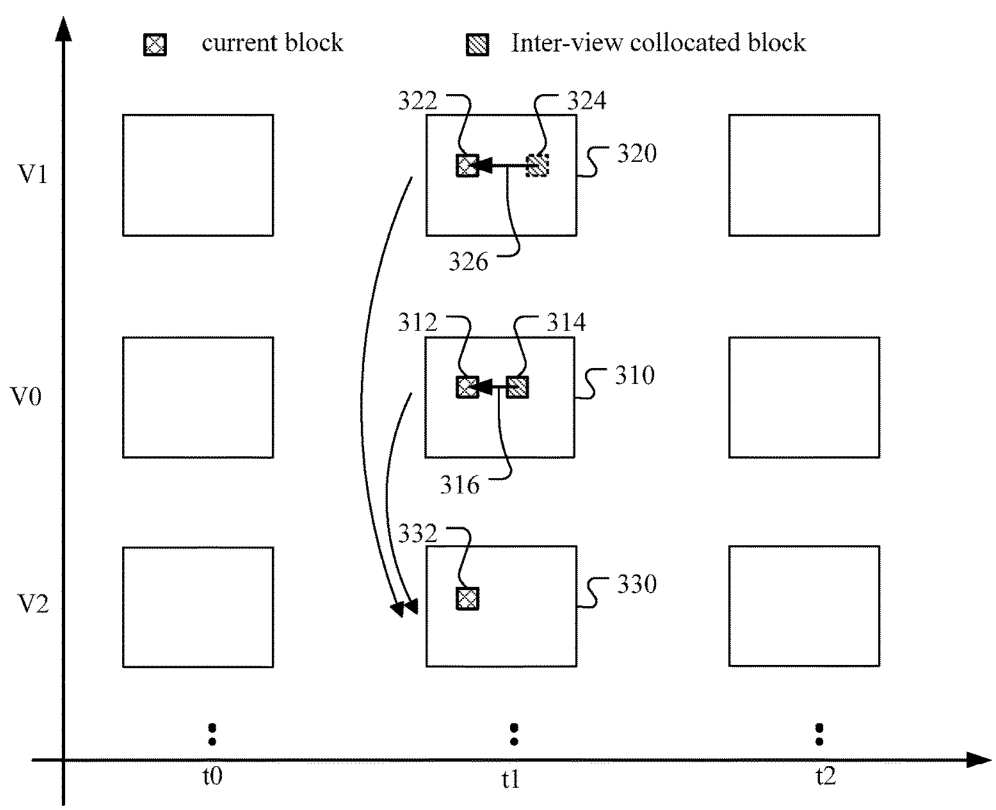
FIG. 3 illustrates an example of inter-view motion vector prediction (MVP) candidate and inter-view Merge candidate derivation according to high efficiency video coding (HEVC) based three-dimensional video coding.
Figure 4:
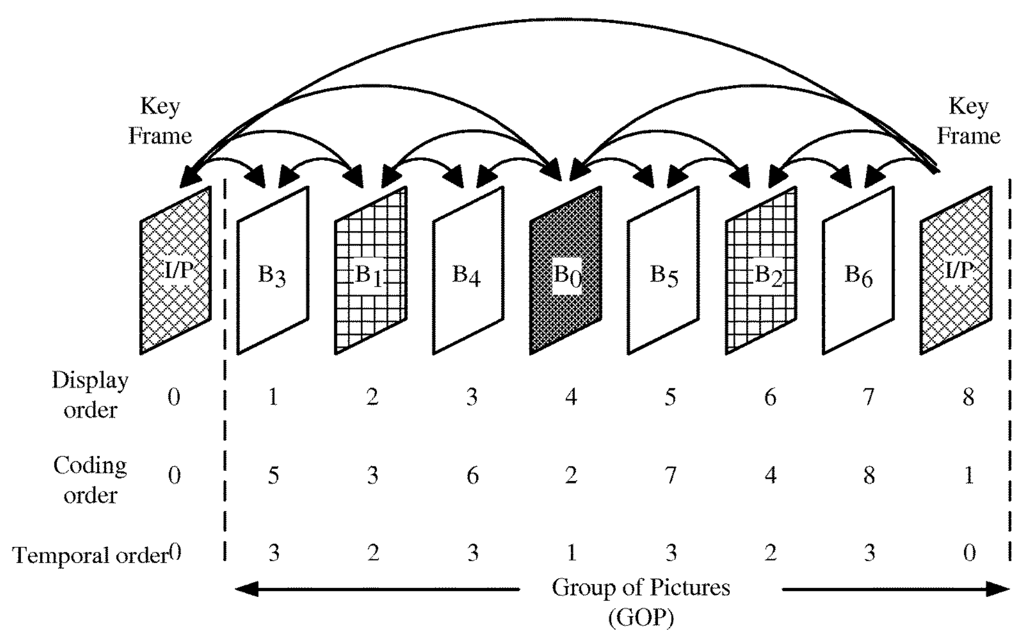
FIG. 4 illustrates an example of four-level hierarchical B-picture scheme for temporal scalable video coding.
Figure 5:
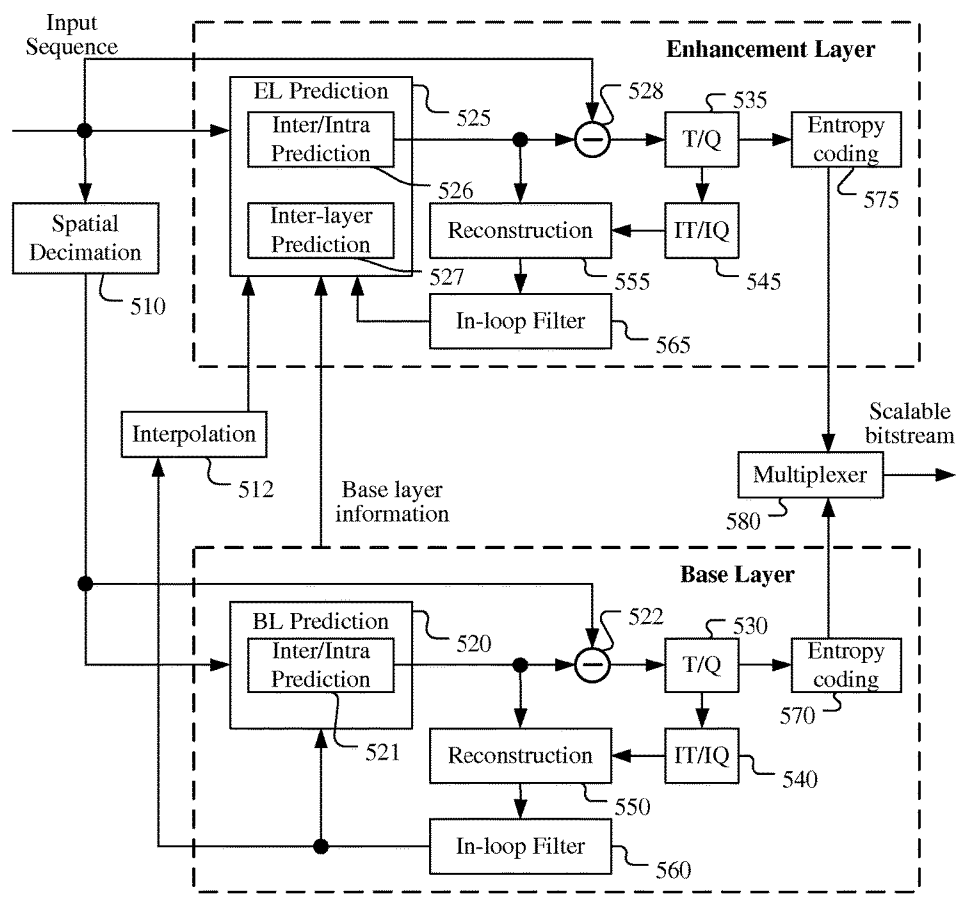
FIG. 5 illustrates an example of two-layer spatial temporal scalable video coding based on a pyramid coding scheme.

In three-dimensional video coding systems and scalable video coding systems, the motion information can be used for depth map coding, dependent view video coding, and enhancement layer video coding. However, in order to utilize the motion information for three-dimensional video coding and scalable video coding, additional buffer may be needed to store the motion information. For each reference picture, the motion information of each block includes motion vector, reference picture index, and inter/intra mode information. For high definition video, the motion information buffer may become significant. For example, a 2048×1080 video sequence will require more than 2 Mbits memory to store the motion information for each picture having a block size of 64×64. Embodiments of the present invention further reduce the memory requirement of motion information at the decoder.

In 3D video coding, depth coding can refer to motion information of corresponding texture data for 3D video coding. However, since the motion information associated with texture coding usually is more accurate than the motion information associated with the depth. Therefore, motion information from corresponding texture data will be more useful than the motion information from depth coding. Accordingly, the temporal motion information for depth coding becomes less important when texture-based motion information is available. In the present disclosure, video data may refer to texture data or depth data. According to one embodiment, reference to the temporal motion information can be disable/enable conditionally according to the video data type. The video data type in this disclosure refers to whether the video data is texture data or depth data. For example, a flag, sps_temporal_mvp_enable_flag in the sequence level can be used to indicate whether temporal MVP is enabled. If the sequence level flag indicates that the temporal MVP for depth is disabled and the current picture corresponds to a depth map, any slice level syntax related to temporal MVP can then be removed. Therefore, the buffer related to motion information at both the encoder side and the decoder side can be eliminated to reduce system cost. The slice level syntax related to temporal MVP may include the slice temporal MVP enable flag (e.g., slice_temporal_mvp_enable_flag), collocated picture index (e.g., collocated_ref_idx), and collocated picture direction (e.g., collocated_from_10_flag). In an embodiment, the flag for enabling temporal MVP for depth data is set as disabled when the flag for enabling temporal MVP for texture data is enabled. The motion information obtained from the texture data is generally more reliable than the motion information obtained from the corresponding depth data. The temporal MVP for depth data may be disabled as the depth data may reuse the motion information obtained from the texture data if temporal MVP is used in coding texture data. In this case, the encoder and decoder systems only require the MV buffer for storing motion information related to temporal MVP for the texture data, where buffer for storing motion information related to temporal MVP for the depth data can be eliminated.

For 3D video coding, the dependent view coding can refer to the motion information of another view (e.g., base view) corresponding to a same time instance. However, since an inter-view reference picture and a current dependent view may correspond to a scene at the same time instance and different viewing positions, the motion information from inter-view reference picture may be more useful than the temporal motion information of current view. In other words, the temporal motion information for dependent view becomes less important when the motion information of inter-view reference picture is available. The above case is especially true if the depth map for the current view is also available since the depth map for the current view can be used to derive a disparity vector for locating a corresponding block in the inter-view reference picture. According to another embodiment of the present invention, reference to the temporal motion information is disable/enable conditionally based on the view type. The view type in this disclosure refers to whether the video data corresponds to a dependent view or a base view. For example, if a current picture being coded corresponds to a texture picture in a dependent view and the disparity vector is also available, the associated motion information can be removed. For example, any slice level syntax related to temporal MVP can be removed. Therefore, the buffer for storing motion information for the dependent view at both the encoder side and the decoder side can be eliminated to reduce system cost. The slice level syntax related to temporal MVP may include the slice temporal MVP enable flag (e.g., slice_temporal_mvp_enable_flag), collocated picture index (e.g., collocated_ref_idx), and collocated picture direction (e.g., collocated_from_10_flag).

For scalable video coding, enhancement layer coding can refer to the motion information of the base layer. However, since the base layer and the enhancement layer correspond to a scene at the same time instance, the motion information from the base layer may be more useful than the temporal motion information of the enhancement layer. In other words, the temporal motion information for the enhancement layer becomes less important when the motion information of base layer is available especially for SNR scalability. In yet another embodiment of the present invention, reference to the temporal motion information can be enabled or disabled conditionally based on the layer type. The layer type in this disclosure refers to whether the video data corresponds to an enhancement layer or a base layer. For example, if current coding picture corresponds to an enhancement layer and the base-layer motion information is also available, the flag will indicate that the temporal MVP is removed conditionally. With temporal motion vector prediction disabled for the enhancement layer, the buffer for storing motion information for the enhancement layer at both the encoder side and the decoder side can be eliminated to reduce system cost. Other related flags, such as collocated_from_10_flag and collocated_ref_idx can also be removed conditionally.

In another embodiment, the size of the candidate list for Merge mode or advanced motion vector prediction (AMVP) is modified according to the number of available motion vector information. For example, for depth coding in HTM version 4.0, the size of the candidate list for Merge mode is 5 or 6 (with MPI included) depending on whether motion parameter inheritance (MPI) for depth MV is included. The size of the MVP candidate list for AMVP is 2. If TMVP is disabled for depth coding according to an embodiment of the present invention, the size of the candidate list for Merge mode will be 4 or 5 (with MPI included) depending on whether MPI is included.

In addition to the conditional syntax changes to support aforementioned MV buffer reduction, other means can also be used to eliminate the MV buffer. In one embodiment, a coding profile specifying limitation is used to remove the MV buffer. In this case, the values of the temporal_mvp related syntax can be limited to indicate MV buffer reduction. For example, the TMVP enable flag in the slice level (i.e., slice_temporal_mvp_enable_flag) is set to 0, collocated_from_10_flag can be equal to 0 or 1 by default, and collocated_ref idx is set to 0 or any other default value. Also, the syntax element related to the size of candidate list for Merge mode (i.e., five_minus_max_num_merge_cand) is set to 1 or any other default value within a range for a specific profile. Accordingly, the MV buffer can be eliminated while keeping the syntax unchanged.

To reduce the memory requirement of motion information of decoder, an embodiment according to the present invention uses a sequence level flag (i.e., sps_temporal_mvp_enable_flag) to enable or disable TMVP for depth coding, dependent views or enhancement layer coding. In another embodiment, a slice level flag (i.e., slice_temporal_mvp_enable_flag) is used to enable or disable TMVP for depth coding, dependent views or enhancement layer coding. The disabling/enabling of TMVP syntax may be signalled in other places in the bitstream such as picture parameter set (PPS) or any other parameter set (e.g. Video parameter set, Adaptive parameter set). Accordingly, an enable flag, pps_temporal_mvp_enable_flag can be signalled at the picture level to enable or disable TMVP for depth coding, dependent views or enhancement layer coding. When the flag is set to disable TMVP, the TMVP for the entire depth map sequence will be set to be unavailable while the TMVP for texture coding is still enabled.

Figure 6:
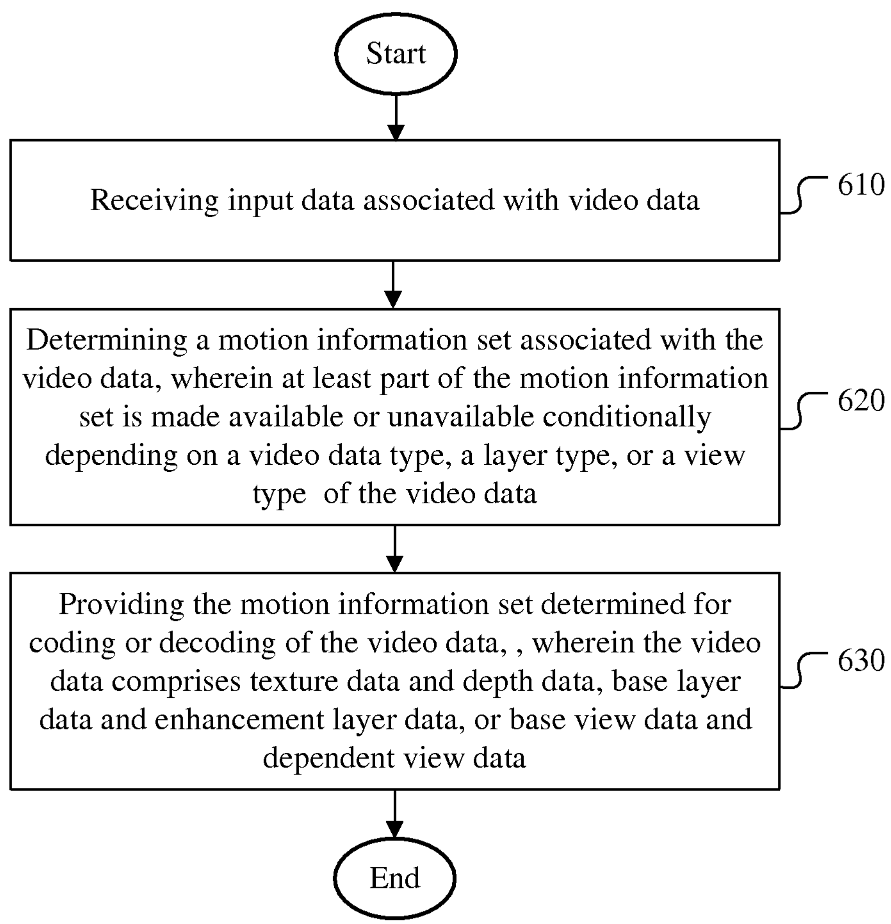
FIG. 6 illustrates an exemplary flow chart for a three-dimensional video coding system or a scalable video coding system incorporating an embodiment of the present invention to conditionally make temporal motion information available or unavailable depending on the video data type.

FIG. 6 illustrates an exemplary flowchart for a three-dimensional video coding system or a scalable video coding system incorporating an embodiment of the present invention to conditionally make the temporal motion information available or unavailable depending on the video data type. The system receives input data associated with video data as shown in step 610. For encoding, the input data may correspond to original texture or depth data of a sequence, a picture, a slice, a largest coding unit (LCU) or a coding unit. For decoding, the input data corresponds to coded texture or depth data for a sequence, a picture, a slice, a largest coding unit (LCU) or a coding unit. The input data may be retrieved from storage such as a computer memory, buffer (RAM or DRAM) or other media. The input data may also be received from a processor such as a controller, a central processing unit, a digital signal processor or electronic circuits that produce the input data. A motion information set associated with the video data in step 620, wherein at least part of the motion information set is made available or unavailable conditionally depending on a video data type, a layer type, or a view type of the video data. For encoding, the motion information set is derived from the input video data. For decoding, the motion information set is determined from the bitstream. The motion information set determined is then provided for coding or decoding of the video data, other video data, or both.

A three-dimensional video coding or a scalable video coding system can be configured according to a coding profile or a flag in the bitstream to make motion information available or unavailable depending on the video data type. In one embodiment, the temporal motion information is made unavailable for the depth sequence/picture, and the temporal motion information is made available for the texture sequence/picture in a dependent view or a base view. In another embodiment, the temporal motion information is made unavailable for the texture sequence/picture in a dependent view, and the temporal motion information is made available for the texture sequence/picture or the depth sequence/picture in a base view. In yet another embodiment, the temporal motion information is made unavailable for the texture sequence/picture or the depth sequence/picture in a dependent view, and the temporal motion information is made available for the texture sequence/picture in a base view. In yet another embodiment, the temporal motion information is made unavailable for the sequence/picture in an enhancement layer, and the temporal motion information is made available for the sequence/picture in a base layer.

The flowchart shown in FIG. 6 is intended to illustrate examples of temporal motion information management for video coding. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for a three-dimensional video decoding system, the method comprising:

receiving input data associated with video data from a bitstream;

determining a motion information set associated with the video data, wherein a part of the motion information set is associated with a temporal motion vector prediction;

determining a video data type of the video data, wherein the video data type is one of a texture data type and a depth data type;

parsing a high-level syntax element indicating whether the temporal motion vector prediction is enabled or disabled for the depth data type from the bitstream;

when the video data type is determined to be the depth data type and the parsed high-level syntax element indicates that the temporal motion vector prediction is enabled for the depth data type, configuring the part of the motion information set to be available and parsing one or more low-level syntax elements related to the temporal motion vector prediction from the bitstream;

when the video data type is determined to be the depth data type and the parsed high-level syntax element indicates that the temporal motion vector prediction is disabled for the depth data type, configuring the part of the motion information set to be unavailable and skipping parsing the one or more low level syntax elements from the bitstream;

when the video data type is determined to be the texture data type, configuring the part of the motion information set to be available or unavailable based on information derived from the bitstream, wherein the information is different from the high-level syntax element indicating whether the temporal motion vector prediction is enabled or disabled for the depth data type; and providing the motion information set for decoding of the video data.

2. The method of claim 1, wherein the high-level syntax element is signaled in a sequence level or a picture level.

3. The method of claim 1, wherein the high-level syntax element is set to a value indicating whether said part of the motion information set is available or unavailable according to a coding profile for the video data.

4. The method of claim 1, wherein said part of the motion information set is made unavailable if the video data corresponds to a first texture sequence or picture in one dependent view, and said part of the motion information set is made available if the video data corresponds to a second texture sequence or picture, or a depth sequence or picture in a base view, and wherein said part of the motion information set comprises temporal motion vector information.

5. The method of claim 1, wherein said part of the motion information set is made unavailable if the video data corresponds to a first texture sequence or picture, or a depth sequence or picture in one dependent view, and said part of the motion information set is made available if the video data corresponds to a second texture sequence or picture in a base view, and wherein said part of the motion information set comprises temporal motion vector information.

6. The method of claim 1, wherein a coding profile is selected for the three-dimensional video coding system or the scalable video coding system, wherein the coding profile configures a syntax element to a desired value, and the syntax element is signaled in a sequence level, a picture level, a slice level, a video parameter set or an adaptation parameter set according to the video data type.

7. The method of claim 6, wherein said part of the motion information set is made unavailable if the video data corresponds to a depth sequence or a depth picture, and said part of the motion information set is made available if the video data corresponds to a texture sequence or a texture picture in one dependent view or one base view, and wherein said part of the motion information set comprises temporal motion vector information.

8. The method of claim 1, wherein said part of the motion information set is made unavailable for the depth data if said part of the motion information set is made available for the texture data, and wherein said part of the motion information set comprises temporal motion vector information.

9. The method of claim 1, wherein candidate-list size associated with Merge mode or advanced motion vector prediction (AMVP) mode is dependent on whether said part of the motion information set is made available or unavailable, wherein the Merge mode or the AMVP mode is used to code the motion information set associated with the video data.

10. An apparatus for a three-dimensional video decoding system, the apparatus comprising:

processing circuitry configured to:

receive input data associated with video data from a bitstream;

determine a motion information set associated with the video data, wherein a part of the motion information set is associated with a temporal motion vector prediction;

determining a video data type of the video data, wherein the video data type is one of a texture data type and a depth data type;

parse a high-level syntax element indicating whether the temporal motion vector prediction is enabled or disabled for the depth data type from the bitstream;

when the video data type is determined to be the depth data type and the parsed high-level syntax element indicates that the temporal motion vector prediction is enabled for the depth data type, configure the part of the motion information set to be available and parse one or more low-level syntax elements related to the temporal motion vector prediction from the bitstream;

when the video data type is determined to be the depth data type and the parsed high-level syntax element indicates that the temporal motion vector prediction is disabled for the depth data type, configure the part of the motion information set to be unavailable and skip parsing the one or more low level syntax elements from the bitstream;

when the video data type is determined to be the texture data type, configure the part of the motion information set to be available or unavailable based on information derived from the bitstream, wherein the information is different from the high-level syntax element indicating whether the temporal motion vector prediction is enabled or disabled for the depth data type; and provide the motion information set for decoding of the video data.

11. The apparatus of claim 10, wherein the high-level syntax element is signaled in a sequence level or a picture level.

12. The apparatus of claim 10, wherein the high-level syntax element is set to a value indicating whether said part of the motion information set is available or unavailable according to a coding profile for the video data.

13. The apparatus of claim 10, wherein said part of the motion information set is made unavailable if the video data corresponds to a depth sequence or a depth picture, and said part of the motion information set is made available if the video data corresponds to a texture sequence or a texture picture in one dependent view or one base view, and wherein said part of the motion information set comprises temporal motion vector information.

14. The apparatus of claim 10, wherein said part of the motion information set is made unavailable for the depth data if said part of the motion information set is made available for the texture data, and wherein said part of the motion information set comprises temporal motion vector information.

15. A method for a three-dimensional video encoding system, the method comprising:

receiving input data associated with video data;

determining a motion information set associated with the video data, wherein a part of the motion information set is associated with a temporal motion vector prediction;

determining a value of a high-level syntax element indicating whether the temporal motion vector prediction is enabled or disabled for the depth data type;

when a video data type of the video data is a depth data type:

in response to the value of the high-level syntax element indicates that the temporal motion vector prediction is enabled for the depth data type, configuring the part of the motion information set to be available and incorporating one or more low-level syntax elements related to the temporal motion vector prediction into a bitstream; and in response to the value of the high-level syntax element indicates that the temporal motion vector prediction is disabled for the depth data type, configuring the part of the motion information set to be unavailable and skipping incorporating the one or more low level syntax elements into the bitstream;

when the video data type the video data is a texture data type, determining whether the part of the motion information set is available or unavailable, and incorporating an information indicating whether the part of the motion information set is available or unavailable into the bitstream, wherein the information is different from the high-level syntax element;

providing the motion information set for encoding of the video data.

* * * * *